US008758567B2

(12) United States Patent
Brungardt

(10) Patent No.: US 8,758,567 B2
(45) Date of Patent: Jun. 24, 2014

(54) CATIONIC WET STRENGTH RESIN MODIFIED PIGMENTS IN BARRIER COATING APPLICATIONS

(75) Inventor: Clement L. Brungardt, Oxford, PA (US)

(73) Assignee: Hercules Incorporated, Wilmington, DE (US)

( * ) Notice: Subject to any disclaimer, the term of this patent is extended or adjusted under 35 U.S.C. 154(b) by 930 days.

(21) Appl. No.: 12/477,432

(22) Filed: Jun. 3, 2009

(65) Prior Publication Data

US 2010/0310776 A1 Dec. 9, 2010

(51) Int. Cl.
*D21H 17/67* (2006.01)
*D21H 17/00* (2006.01)
*D21H 17/68* (2006.01)
*D21H 19/00* (2006.01)

(52) U.S. Cl.
CPC .............. *D21H 17/71* (2013.01); *D21H 17/68* (2013.01); *D21H 19/00* (2013.01)
USPC .................................... 162/181.8; 162/164.1

(58) Field of Classification Search
CPC ........ D21H 17/68; D21H 19/00; D21H 17/71
USPC ........................................... 162/181.8, 164.1
See application file for complete search history.

(56) References Cited

U.S. PATENT DOCUMENTS

| | | | | |
|---|---|---|---|---|
| 2,795,545 | A | | 6/1957 | Gluesenkamp ................. 252/28 |
| 4,510,019 | A | * | 4/1985 | Bartelloni ...................... 162/141 |
| 4,885,330 | A | | 12/1989 | Brungardt et al. ............. 524/447 |
| 4,915,839 | A | * | 4/1990 | Marinaccio et al. ...... 210/500.23 |
| 5,006,574 | A | * | 4/1991 | Sennett et al. ................. 523/351 |
| 5,169,441 | A | * | 12/1992 | Lauzon ........................... 106/416 |
| 5,336,311 | A | * | 8/1994 | Curtis et al. ................... 106/416 |
| 5,384,013 | A | * | 1/1995 | Husband et al. ............ 162/168.1 |
| 5,438,087 | A | * | 8/1995 | Ikeda et al. .................... 524/272 |
| 5,531,863 | A | | 7/1996 | Propst ................................. 162/5 |
| 5,611,890 | A | * | 3/1997 | Vinson et al. .................. 162/111 |
| 5,635,279 | A | * | 6/1997 | Ma et al. ......................... 428/174 |
| 5,668,246 | A | | 9/1997 | Maslanka ........................ 528/336 |
| 5,672,249 | A | * | 9/1997 | Vinson et al. .................. 162/111 |
| 5,695,608 | A | * | 12/1997 | Yagi et al. ....................... 162/135 |
| 5,700,352 | A | * | 12/1997 | Vinson et al. .................. 162/111 |
| 5,830,317 | A | * | 11/1998 | Vinson et al. .................. 162/125 |
| 5,885,340 | A | | 3/1999 | Bailey et al. |
| 5,916,420 | A | | 6/1999 | Wurster et al. |
| 5,958,185 | A | * | 9/1999 | Vinson et al. .................. 162/111 |
| 6,030,443 | A | | 2/2000 | Bock et al. .................... 106/217.5 |
| 6,066,379 | A | * | 5/2000 | Ma et al. ........................... 428/53 |
| 6,358,576 | B1 | | 3/2002 | Adur ............................... 428/34.2 |
| 6,359,040 | B1 | | 3/2002 | Burdick ............................. 524/43 |
| 6,429,253 | B1 | | 8/2002 | Guerro et al. .................. 524/514 |
| 6,531,196 | B1 | | 3/2003 | Aho et al. ...................... 428/34.2 |
| 6,554,961 | B1 | | 4/2003 | Riehle et al. ................. 162/164.3 |
| 6,722,560 | B2 | | 4/2004 | Player et al. .................. 229/5.84 |
| 6,740,373 | B1 | * | 5/2004 | Swoboda et al. .............. 428/34.2 |
| 7,081,512 | B2 | | 7/2006 | Riehle ............................. 528/480 |
| 7,148,271 | B2 | | 12/2006 | Michelman et al. ............. 524/13 |
| 7,641,947 | B2 | * | 1/2010 | Chen et al. .................. 428/32.22 |
| 7,736,466 | B2 | * | 6/2010 | Singh et al. .................... 162/175 |
| 7,918,313 | B2 | * | 4/2011 | Gross et al. ..................... 181/294 |
| 8,030,365 | B2 | * | 10/2011 | Mohan et al. .................... 521/56 |
| 8,034,847 | B2 | * | 10/2011 | Mohan et al. .................... 521/56 |
| 2003/0127205 | A1 | * | 7/2003 | Odberg et al. ................. 162/135 |
| 2004/0209023 | A1 | * | 10/2004 | Swoboda et al. ............. 428/34.2 |
| 2005/0070655 | A1 | * | 3/2005 | Van Den Bergen et al. .. 524/445 |
| 2006/0235129 | A1 | * | 10/2006 | Weigl et al. .................... 524/445 |
| 2007/0044929 | A1 | * | 3/2007 | Mohan et al. .................. 162/158 |
| 2008/0022645 | A1 | * | 1/2008 | Skirius et al. .................... 55/524 |

(Continued)

FOREIGN PATENT DOCUMENTS

WO 0163049 8/2001
WO 2004099321 11/2004

OTHER PUBLICATIONS

International Search Report, PCT/US2010/037064, Aug. 4, 2010, pp. 1-2.
Certification of IDS.
F. Wu, "High Performance Talc for Barrier Packaging," 2007 TAPPI Coating and Graphic Arts Conference, (Miami) Apr. 22-25, 2007.
M. Kleebaner, "Polymer dispersions with inorganic pigments as a Back Barrier Coating on Folding Boxboard," 6th International Paper and Coating Chemistry Symposium (Stockholm), Jun. 7-9, 2006.

(Continued)

*Primary Examiner* — Gregory Webb
(74) *Attorney, Agent, or Firm* — Michael Herman; Joanne Rossi

(57) ABSTRACT

Methods for increasing one or more barrier properties of a sheet of paper or paperboard, which method comprises (a) preparing a dispersion having a cationic zeta potential by combining (1) a mixture containing one or more anionic pigments with (2) one or more polyamine-epihalohydrin cationic wet strength resins; (b) coating at least one side of the sheet of paper or paperboard with the dispersion at a coating weight of from about 0.1 g/m$^2$ to about 20 g/m$^2$; (c) drying the coated sheet of paper or paperboard; (d) coating the dried sheet of paper or paperboard with a functional barrier top coating formulated to provide resistance to one or more of the following (1) liquid water, (2) water vapor, (3) oil, (4) grease, (5) gas permeability, (6) skid, or (7) static. Also claimed are dispersions used in the methods, which dispersions have a cationic zeta potential for use as a preliminary coating on a sheet of paper or paperboard in advance to a functional barrier top coating, which dispersions comprise: (a) a mixture containing: (i) one or more anionic pigments in an amount of at least about 20% dry weight of the anionic pigment-containing mixture, (ii) one or more neutral or cationic water soluble binders in an amount up to about 80% dry weight of the anionic pigment-containing mixture, and (b) one or more polyamine-epihalohydrin cationic wet strength resins in a weight ratio of resin:anionic pigment from about 0.03:1 to about 0.8:1.

3 Claims, No Drawings

(56) References Cited

U.S. PATENT DOCUMENTS

| | | | |
|---|---|---|---|
| 2008/0035292 A1* | 2/2008 | Singh et al. .................. 162/175 |
| 2008/0131707 A1* | 6/2008 | Feeney et al. ................ 428/451 |
| 2009/0148575 A1* | 6/2009 | Lang-Wittkowski et al. 426/392 |
| 2010/0032114 A1* | 2/2010 | Mohan et al. ................ 162/138 |
| 2010/0032115 A1* | 2/2010 | Mohan et al. ................ 162/162 |
| 2010/0038266 A1* | 2/2010 | Hallstrom et al. ........... 206/223 |
| 2010/0047404 A1* | 2/2010 | Hallstrom et al. ........... 426/124 |
| 2010/0084103 A1* | 4/2010 | Reinicke .................... 162/164.6 |
| 2010/0310776 A1* | 12/2010 | Brungardt .................... 427/391 |
| 2010/0310883 A1* | 12/2010 | Brungardt .................. 428/424.8 |

OTHER PUBLICATIONS

R. Popil, "Optimizing Water Resistance of Polymeric/pigmented Linerboard Coatings Using Pigments for Linerboard Wax Replacement," TAPPI—Paper Coatings and Graphic Arts Conference Proceedings, (Atlanta) Apr. 24-27, 2006.

* cited by examiner

CATIONIC WET STRENGTH RESIN MODIFIED PIGMENTS IN BARRIER COATING APPLICATIONS

BACKGROUND OF THE INVENTION

Paperboard is widely used throughout the world in packaging applications. Paperboard can be printed and folded into attractive and functional containers that are inexpensive, protect their contents, and are based on renewable and recyclable raw materials. Paperboard's poor barrier properties limit its usefulness in food packaging, however; especially in applications that require high barrier resistance to liquid water, water vapor, gas permeability, oil and grease, slip, and static.

To overcome this limitation, others have added additional functional layers to the paperboard, thus increasing the paperboard's barrier properties. For example, laminated films, extruded polymer coatings, and wax coatings are known to improve paperboard's resistance to both liquid water and water vapor. These coatings require additional processing, are expensive relative to the cost of the untreated paperboard, and make the paperboard harder to recycle.

Recently, however, recyclable functional polymer coatings have become available that improve paperboard's barrier properties while maintaining the paperboard's recyclability. These recyclable barrier materials form a film using starch, protein, polyvinylalcohol, or synthetic polymer latex such as those available from Michelman Inc., Cincinnati, Ohio and Spectra-Kote, Gettysburg, Pa. These recyclable functional polymer coatings still require additional processing and are expensive relative to the cost of untreated paperboard.

For many demanding food packaging and other demanding applications, at least two layers of functional barrier top coating must be applied, further increasing the cost of the final product. Subsequent coatings are necessary to eliminate pinholes and to increase the overall strength and performance of the paperboard. It is well known in the industry that an inexpensive and less functional base coat may be applied to reduce both the overall porosity of the paperboard and the amount of functional top coat required. The most commonly used base coats include, but are not limited to, kaolin clay, talc, or calcined clay modified with a latex binder, such as modified styrene butadiene, styrene-acrylate, and polyurethane latexes. For example, a base coat of kaolin clay and styrene-butadiene latex requires a coating weight of between 9 to 27 g/m$^2$ to improve the Cobb sizing of a functional top coat of Popil.

Cationic pigments are also well-known in the industry and are known to give improved properties over the same pigment in anionic form. In the industry, most cationic wet strength resin treated pigments have been treated at a resin addition level of less than 10%, based on the dry weight of the pigment. Generally, these coatings have been used as top coats. There is, however, still a need in the industry for cost-effective ways to provide a paperboard product for processes that require highly resistant barrier properties.

BRIEF SUMMARY OF THE INVENTION

The present invention relates, in general, to the surprising discovery that a significantly increased addition of cationic wet strength polymer resins to anionic pigments can create a dispersion for use in coating processes that has superior barrier properties when used as a base coating for paperboard. This discovery allows for the cost-effective production of highly resistant paperboard for applications that require durability and high barrier resistance to liquid water, water vapor, gas permeability, oil and grease, slip, and static. The present invention also relates to a novel method of improving the performance and reducing the cost of paper and paperboard by using the cationic pigment dispersion as the base coat underneath a functional top layer coating.

One embodiment of the present invention includes a method for increasing one or more barrier properties of a sheet of paper or paperboard, comprising: (a) preparing a dispersion having a cationic zeta potential by combining (1) a mixture containing one or more anionic pigments with (2) one or more polyamine-epihalohydrin cationic wet strength resins; (b) coating at least one side of the sheet of paper or paperboard with the dispersion at a coating weight of from about 0.1 g/m$^2$ to about 20 g/m$^2$; (c) drying the coated sheet of paper or paperboard; and (d) coating the dried sheet of paper or paperboard with a functional barrier top coating formulated to provide resistance to one or more of the following (1) liquid water, (2) water vapor, (3) food oils, (4) grease, (5) gas permeability, (6) skid, or (7) static.

Another embodiment of the invention is a dispersion having a cationic zeta potential for use as a base coating on a sheet of paper or paperboard as a primer for a functional barrier top coating, comprising: (a) one or more anionic pigments in an amount of at least about 20% dry weight of the anionic pigment-containing mixture, and (b) one or more polyamine-epihalohydrin cationic wet strength resins.

DETAILED DESCRIPTION OF THE INVENTION

As used herein, the singular terms "a" and "the" are synonymous and used interchangeably with "one or more" or "at least one" unless the context clearly indicates a contrary meaning. Accordingly, for example, reference to "a compound" herein or in the appended claims can refer to a single compound or more than one compound. Additionally, all numerical values, unless otherwise specifically noted, are understood to be modified by the word "about." Unless otherwise indicated, the terms "dry weight %" and "% dry weight" mean the dry weight percent of the mixture containing only the anionically charged pigment and the optional water soluble polymer binder, and exclude the weight of the polyamine-epihalohydrin cationic wet strength resin. Unless otherwise indicated, all ratios are weight ratios between the cationic resin and the anionic pigment, and exclude the weight of any optional water soluble binder.

Compositions and processes in accordance with the various embodiments of the present invention are suitable for use to coat a sheet of paper or paperboard to increase its barrier resistant properties. The present invention includes a novel dispersion composition of anionic pigment, polyamine-epihalohydrin cationic wet strength resin, and an optional neutral or cationic, natural or synthetic polymer binder. The present invention also includes a method of improving the performance and reducing the cost of manufacturing paper and paper board with high barrier resistance to liquid water, water vapor, gas permeability, oil and grease, slip, and static.

The method comprises four steps: (1) preparing a dispersion by combining (i) a mixture containing one or more anionically charged pigments and, optionally, one or more water soluble polymer binders with (ii) a polyamine-epihalohydrin cationic wet strength resin; (2) coating paper or paper board with a base coat of the dispersion; (3) drying the coated paper or paper board; and (4) applying a functional barrier top coating that resists one or more of the following: liquid water, water vapor, gas permeability, oil and grease, slip, and static.

It is believed that the base coat reduces the porosity and roughness of the paper or paper board because the pigments in the dispersion deposit in the natural pores of the paper or paperboard. This reduces the amount of functional barrier top coating needed to obtain the desired barrier resistance properties. This reduces the overall cost of making high performance, high barrier resistant paper or paperboard.

The base coat can be added to one or both sides of the base sheet. The functional barrier top coating performance improves as the coating weight of the base coat increases. Preferably, the paper or paperboard is coated with the dispersion at a coating weight from about 0.1 to about 20 $g/m^2$ per side. More preferably, the paper or paperboard is coated with the dispersion at a coating weight from about 1 to about 10 $g/m^2$ per side. Most preferably, the paper or paperboard is coated with the dispersion at a coating weight from about 1.5 to about 5.0 $g/m^2$ per side. For the above, the coating weight is based on the weight of the dried coating.

The pigment for the dispersion can be any of the synthetic or natural pigments used in papermaking, paper coating, or paint applications. Preferably, the pigment is a talc, kaolin clay, bentonite clay, or laponite. More preferably the pigment is bentonite clay or talc. Most preferably, the pigment is talc.

The percentage of pigment in the dispersion required to obtain the desired improvements in barrier resistance depends on the particle size and aspect ratio of the pigment. In general, dispersions containing small particle size, high aspect ratio pigments—such as laponite or bentonite clay—require mixtures containing pigment addition levels of at least about 20% dry weight of the mixture to obtain the desired benefits. Preferably, the mixture contains from about 25% to about 100% dry weight of laponite or bentonite clay. More preferably, when laponite is used as the pigment, the mixture contains from about 25% to about 50% dry weight of laponite. More preferably, when bentonite clay is used as the pigment, the mixture contains from about 25% to about 75% dry weight of bentonite clay.

Dispersions containing large particle size, lower aspect ratio pigments—such as kaolin clay or talc—require mixtures containing pigment addition levels of at least about 25% dry weight of the mixture to obtain the desired benefits. More preferably, when kaolin clay or talc is used as the pigment, the mixture contains from about 50% to about 100% dry weight of kaolin clay or talc. Most preferably, when kaolin clay or talc is used as the pigment, the mixture contains about 75% dry weight of kaolin clay or talc.

The polyamine-epihalohydrin cationic wet strength resin can be any of the resins widely used to impart temporary or permanent wet strength to paper, liquid packaging board, or paperboard. Examples of these resins are known in the industry as disclosed in U.S. Pat. Nos. 7,081,512; 6,554,961; and 5,668,246. The polyamine-epihalohydrin cationic wet strength resins of the present invention include, but are not limited to, polyaminopolyamide-epihalohydrin resins, such as polyaminoamide-epihalohydrin resins, polyamide-polyamine-epihalohydrin resins, polyaminepolyamide-epihalohydrin resins, aminopolyamide-epihalohydrin resins, polyamide-epihalohydrin resins; polyalkylene polyamine-epihalohydrin; and polyaminourylene-epihalohydrin resins, copolyamide-polyurylene-epichlorohydrin resins; polyamide-polyurylene-epichlorohydrin resins. In a preferred embodiment of the invention, the epihalohydrin is epichlorohydrin. Preferably the polyamine-epihalohydrin cationic wet strength resin is polyaminourylene-epihalohydrin resin, polyaminopolyamide-epihalohydrin resin, polyamine-epihalohydrin resin, or polyalkyldiallylamine-epihalohydrin resin, all available from Hercules Incorporated, Wilmington, Del.

More preferably, the cationic wet strength resin is polyaminopolyamide-epihalohydrin resin.

The polyamine-epihalohydrin cationic wet strength resin addition level should be sufficient to reverse the pigment's anionic charge and to give the pigment a cationic (positive) zeta potential. The amount of polyamine-epihalohydrin cationic wet strength resin needed to reverse the pigment's anionic charge depends on the charge densities of the cationic resin and the anionic pigment.

When the dispersion contains high charge density, high surface area pigments—like laponite or bentonite clay—polyamine-epihalohydrin cationic wet strength resin:anionic pigment ratios from about 0.5:1 to about 2:1 are preferred. Preferably, when the dispersion contains laponite, polyamine-epihalohydrin cationic wet strength resin:anionic pigment ratios are about 1.5:1. Preferably, when the dispersion contains bentonite clay, polyamine-epihalohydrin cationic wet strength resin:anionic pigment ratios from about 0.6:1 to about 0.8:1 are preferred.

When the dispersion contains low charge density, low surface area pigments—such as kaolin clay or talc—polyamine-epihalohydrin cationic wet strength:anionic pigment ratios from about 0.01:1 to about 0.2:1 are preferred. More preferably, when the dispersion contains kaolin clay or talc, cationic wet strength resin:anionic pigment ratios are from about 0.03:1 to about 0.1:1.

The dispersion optionally contains one or more neutral or cationic, natural or synthetic water soluble polymer binders. These binders are common in the paper industry, and are typically used in wet-end dry strength, size press dry strength, and paper coating co-binder applications. Examples of these polymer binders are disclosed in U.S. Pat. Nos. 6,429,253; 6,359,040; and 6,030,443. The binders increase the strength and physical integrity of the coated paper or paperboard product, Here, the binders may improve adhesion of the base coat to the paperboard, and increase the strength and physical integrity of the base coat itself.

Examples of natural water soluble binders include, but are not limited to, starch; ethylated starch; cationic starch; oxidized starch; enzyme converted starch; alginates; proteins, such as casein; cellulose derivatives, such as hydroxyethylcellulose, methylhydroxyethylcellulose, methyl cellulose, hydroxypropyl cellulose or hydroxypropylguar cellulose; and mixtures thereof. Examples of synthetic water soluble binders include, but are not limited to, polyvinylalcohol; ethylene/vinyl alcohol copolymers; polyvinylamine; polyacrylamide; neutrally and cationically charged copolymers of polyacrylamide; glyoxylated polyacrylamide; polydiallylamine; polydimethyldiallylamine; and copolymers of polydiallylamine or polydimethyldiallylamine.

Preferably, dispersions containing polyamine-epihalohydrin cationic wet strength resin modified laponite or bentonite clay are made from an anionic pigment-containing mixture containing from about 0% to about 75% dry weight water soluble polymer binders and from about 25% to about 100% dry weight laponite or bentonite pigment. More preferably, dispersions containing polyamine-epihalohydrin cationic wet strength resin modified laponite are made from an anionic pigment-containing mixture containing from about 50% to about 75% dry weight water soluble polymer binder and from about 25% to about 50% dry weight laponite pigment. Also more preferably, dispersions containing polyamine-epihalohydrin cationic wet strength resin modified bentonite clay are made from an anionic pigment-containing mixture containing from about 25% to about 75% dry weight water soluble polymer binder and from about 25% to about 75% dry weight bentonite clay pigment. For the above, the dry weight percents refer to the dry weight of the anionic pigment-containing mixture and do not include the cationic wet strength resin.

Preferably, dispersions containing polyamine-epihalohydrin cationic wet strength resin modified talc or kaolin clay are made from an anionic pigment-containing mixture containing from about 0% to about 75% dry weight water soluble polymer binder and from about 25% to about 100% dry weight talc or kaolin clay pigment. More preferably, dispersions containing polyamine-epihalohydrin cationic wet strength resin modified talc or kaolin clay are made from an anionic pigment-containing mixture containing from about 25% to about 50% dry weight water soluble polymer binder and from about 50% to about 75% dry weight talc or kaolin clay pigment. For the above, the dry weight percents refer to the dry weight of the anionic pigment-containing mixture and do not include the cationic wet strength resin.

The base coat is applied and dried using equipment common in the industry for the application of surface treatments to paper or paper board. These include, but are not limited to, paper machine size presses; spray bars; water boxes; on-machine coaters; and off-machine coaters.

The functional barrier top coating can be any coating commonly used in the paper industry, such as Vaporcoat 1500 and Vaporcoat 2200, available from Michelman Inc., Cincinnati, Ohio, or Spectra-Guard 763, available from Spectra-Kote, Gettysburg, Pa. Preferably, the functional barrier top coating contains at least one water-based polymer latex. Optionally, the functional barrier top coating may contain one or more natural or synthetic water soluble polymers, such as starch; ethylated starch; succinic anhydride modified starch; polyvinylalcohol; ethylene/vinylalcohol copolymers; or polylactic acid. Additionally, the functional barrier top coating may also contain one or more pigments, waxes, cross-linkers, water resistant sizing agents, and oil and grease resistant sizing agents.

As one skilled in the art will recognize, the invention is useful in applications that require a highly functional barrier top coating that is resistant to one or more of the following: liquid water; water vapor; oil and grease; gases; skid; and static.

EXAMPLES

For each of the following examples, if the dispersion consists of a water soluble binder, pigment and cationic wet strength resin, the following naming convention is used: XX:YY binder:pigment:resin, where XX is the dry weight % of binder and YY is the dry weight % of the pigment in the anionic pigment containing mixture and excludes the cationic wet strength resin. As previously disclosed, dry weight % is the weight of the binder/pigment mixture and excludes the cationic wet strength resin.

Examples 1-4

Preparation of Cationic Polymer Modified Pigments

Samples of cationic polymer modified pigments were prepared by adding various amounts of cationic wet strength resin to anionic pigments. For each sample, Kymene 557 (polyaminopolyamide-epihalohydrin) (1% solids content), available from Hercules Incorporated, Wilmington, Del., was used. In Example 1, the pigment used was delaminated Hydrogloss 90 kaolin clay (0.5 micron median particle size; 96% less than 2 microns), available from J. M. Huber, Macon, Ga. In Example 2, the pigment used was talc (1-2 microns), available from Rio Tinto—Talc de Luzenac, Toulouse Cedex, France. In Example 3, the pigment used was bentonite (200-300 nanometers), available from Southern Clay Products Inc., Gonzalez, Tex. In Example 4, the pigment used was Laponite RD (25 nanometers), a synthetic pigment available from Southern Clay Products Inc., Gonzalez, Tex. Each of the pigments was in a 1% solids dispersion.

For each Example, various amounts of Kymene 557 corresponding to a percentage of the dry weight of the pigment was added. After each addition, the zeta potential of each sample was measured. Once the charge on the anionic pigment had reversed, additional Kymene 557 was added to determine the optimal Kymene 557 levels to achieve a well-dispersed pigment dispersion with a mean particle size distribution similar to the anionic pigment dispersions. The results for each Example are listed in Table 1. Unless otherwise noted, the dispersion with an asterix (*) is the dispersion referenced in subsequent Examples.

The various Examples show that each of the four anionic pigments begin to floc as its zeta potential approaches 0. Once the pigment reverses charge, however, it begins to re-disperse. The dispersion was considered "well-dispersed" once the dispersion had a mean particle size roughly equivalent to the original anionic pigment dispersion. The amount of polyamine-epihalohydrin resin necessary to achieve this dispersion ranged from approximately 1% of the dry weight of the pigment to approximately 200% of the dry weight of the pigment. In general, pigments with lower charge densities require less polyamine-epihalohydrin resin to reverse the charge and form a well-dispersed cationic pigment.

TABLE 1

Preparation of Cationic Polymer Modified Pigments

| Example Number | Pigment | Cationic Polymer | Addition Level (Based on pigment) | Zeta Potential | Comments |
|---|---|---|---|---|---|
| 1 | Bentolite H | — | — | −35 | Well dispersed |
|   | Bentolite H | Kymene 557 | 5.0% | −34 | Flocked |
|   | Bentolite H | Kymene 557 | 10% | −37 | Flocked |
|   | Bentolite H | Kymene 557 | 20% | +17 | Flocked |
|   | Bentolite H | Kymene 557 | 40% | +16 | Flocked |
|   | Bentolite H | Kymene 557 | 60% | +29 | Well dispersed |
| * | Bentolite H | Kymene 557 | 80% | +30 | Well dispersed |
| 2 | Hydragloss 90 | — | — | −34 | Well dispersed |
|   | Hydragloss 90 | Kymene 557 | 1.0% | −18 | Flocked |
|   | Hydragloss 90 | Kymene 557 | 3.0% | +20 | Flocked |
| * | Hydragloss 90 | Kymene 557 | 5.0% | +81 | Well dispersed |
|   | Hydragloss 90 | Kymene 557 | 7.0% | — | Well dispersed |

TABLE 1-continued

Preparation of Cationic Polymer Modified Pigments

| Example Number | Pigment | Cationic Polymer | Addition Level (Based on pigment) | Zeta Potential | Comments |
|---|---|---|---|---|---|
| 3 | Talc | — | — | −28.1 | Well dispersed |
|  | Talc | Kymene 557 | 1.0% | +12 | Well dispersed |
|  | Talc | Kymene 557 | 3.0% | +35 | Well dispersed |
| * | Talc | Kymene 557 | 5.0% | +27 | Well dispersed |
|  | Talc | Kymene 557 | 10% | +29 | Well dispersed |
|  | Talc | Kymene 557 | 20% | +42 | Well dispersed |
| 4 | Laponite | — | — | −20 | Well dispersed |
|  | Laponite | Kymene 557 | 50% | +25 | Flocked |
|  | Laponite | Kymene 557 | 100% | +24 | Slightly flocked |
| * | Laponite | Kymene 557 | 150% | +9 | Well dispersed |

Example 5

Preparation of Kymene 557 Modified Talc/Starch Dispersions

Samples of 20% solids Kymene 557 modified talc dispersions for use in size press applications were prepared with varied amounts of starch. For example, to prepare the 25:75 starch:talc:Kymene 557 dispersion, a quantity of 9 g of Vantalc 6H II (0.8-1.3 microns), available from R. T. Vanderbilt, Norwalk, Conn., was dispersed into 36 g of distilled water using an over-head stirrer. A 30% solids solution of Penfordgum 280 ethylated starch, available from Penford, Cedar Rapids, Iowa, was prepared by heating the Penfordgum at between 95 and 100° C. for approximately 45 minutes. A 7.2 g aliquot of Kymene 5571H (6.25% solids), available from Hercules Incorporated, Wilmington, Del., was added to 10 g of the cooked starch and mixed. Once the Kymene 557 and starch were well mixed, a quantity of 45 g of the talc dispersion was added and the dispersion was stirred for 5 minutes to create the dispersion. The dispersion was sonicated for 6 minutes using a Branson Sonifier 450 (50% output, setting 4). Finally, the pH of the dispersion was adjusted to 8.0 using NaOH.

Similar methods were used to make the range of starch:pigment:Kymene 557 dispersions listed in Table 2.

Example 6

Size Press Base Coat Addition Method

The samples prepared in Example 5 were applied liner board using a laboratory puddle size press. The Brookfield viscosity of the various Kymene 557 modified laponite, bentonite clay, kaolin clay, and talc dispersions limited their maximum percent solids for size press applications. In order to achieve optimum coating, the Brookfield viscosities of the dispersions, when measured at 100 rpm and 55° C., should be below 200 cps in the size press. For the selected samples a Brookfield viscosity of approximately 100 cps corresponds to approximately 20% solids when the dispersion contains kaolin clay or talc; approximately 5% solids when the dispersion contains bentonite clay; and approximately 3% solids when the dispersion contains laponite.

The samples were applied to individual sheets of 200 g/m² (asis weight) 11 cm×28 cm commercial recycled liner board, available from Green Bay Packaging Inc., Green Bay, Wis., using a laboratory puddle size press. Before each run, the size press rolls were heated to 50° C. by allowing hot water to run over the rolls for five minutes. A 100 mL aliquot of each sample was poured into the size press nip, and the recycled liner board sheets were then passed through the nip. The sheets were immediately dried to 5% moisture using a drum dryer set at 220° F. The coating weight of the coated liner board was calculated using the difference in weight of the coated (wet weight) and uncoated sheets. The size press base coat treated sheets were cured at 85° C. for 30 minutes prior to addition of the functional barrier top coating.

Example 7

Application of Functional Barrier Top Coatings to Paper Board

A 5.1 cm×12.7 cm sheet of polyester was clipped to a standard office clipboard that was duct taped to a lab bench. The reverse side of the sheet was then secured using 2-sided masking tape. A pre-weighed 10.2 cm×16.5 cm sheet of liner board was secured next to the polyester sheet using an exposed edge of the 2-sided masking tape. A bead of functional barrier top coating was applied to the polyester sheet next to the liner board substrate. The functional barrier top coating was applied using a wire-wound drawdown rod pulled through the bead of coating and over the liner board sheet. The coated sheets were allowed to air-dry for one hour, then cured in an oven for two hours at 85° C. The coating weight of the functional barrier top coating applied was determined by comparing the dry weights of the uncoated and coated samples. Coat weight was varied by changing the rod number and varying the % solids of the functional barrier top coating.

Example 8

Evaluation of Various Starch:Pigment:Kymene 557 Mixtures

Combinations of dispersions containing Kymene 557 modified pigments with starch were evaluated. The pigments used were Vantalc 6HII talc, available from R. T. Vanderbilt, Hydraglass 90 kaolin clay, available from J. M. Huber, bentonite clay, and laponite. The particle sizes for each pigment was the same as previously disclosed. The dispersions were created and applied as a base coat to recycled liner board as defined in the previous examples (See Tables 1, 2).

The dispersions were applied to both sides of the recycled liner board using the method described in Example 6. After drying, the base coat addition levels varied from 1 to 3 g/m² per side. The amount of Kymene 557 modified bentonite and laponite base coats that could be added was limited by the % solids and viscosities of the dispersions.

A functional barrier top coating consisting of Vaporcoat 2200, available from Michelman Inc., Cincinnati, Ohio, was applied to the felt side of the base coat treated board using the method described in Example 7. Vaporcoat 2200 is a water-based recyclable functional barrier top coating made using a synthetic polymer latex. A series of Vaporcoat 2200 coated control samples was also made by coating untreated liner board base sheet and a size press starch treated base sheet.

Each combination of base coat and Vaporcoat 2200 top coat was tested for 30-minute Cobb sizing (TAPPI method T-441) and moisture vapor transmission rate (MVTR, TAPPI method T-448). Moisture vapor transmission rate was measured at room temperature (20-23° C.) and 85% humidity. A saturated aqueous KBr solution was used to control the relative humidity in the test chamber to 85%. Cobb sizing and MVTR test results were based on an average of three measurements.

A comparison over a range of Vaporcoat 2200 top coat weights showed that adding a Kymene 557 modified pigment base coat improved functional barrier top coating efficiency in Cobb sizing applications, when compared to the untreated or size press starch treated controls. These results are shown in Table 2. In general, the performance of the base coat/functional top coat combination improved as the percentage of Kymene 557 modified talc or kaolin in the base coat increased from about 25% to about 100% dry weight of the anionic pigment-containing mixture. The best results were obtained at Kymene 557 modified talc levels of from about 75% to about 100% dry weight of the anionic pigment containing mixture in the base coat. For example, without a base coat, a Vaporcoat 2200 coat weight of at least 10 g/m² was needed to obtain a 30-minute Cobb sizing value of 40 g/m². A Vaporcoat 2200 coat weight of only 4.2 g/m² was needed when a 25:75 starch:talc:Kymene 557 base coat was added to the base sheet. The very high surface area Kymene 557 modified bentonite and laponite pigments gave large increases in Vaporcoat 2200 top coat performance at pigment loading as low as 25% to 50% dry weight of the anionic pigment-containing mixture. These results confirm that adding an inexpensive base coat comprised primarily of cationic wet strength resin modified pigment can greatly reduce the amount of expensive functional barrier top coating needed to obtain high levels of water resistance.

A comparison over a range of Vaporcoat 2200 functional top coat weights showed that adding a Kymene 557 modified pigment base coat improved functional barrier top coating efficiency in MVTR applications. These results are shown in Table 2. In general, the performance of the base coat/functional top coat combination improved as the percentage of Kymene 557 modified talc, bentonite, or kaolin in the base coat increased from 25% to 75% dry weight of the anionic pigment-containing mixture. For example, without a base coat, a Vaporcoat 2200 coat weight of 9.8 g/m² was needed to obtain a MVTR of 50 g/m²/day. A Vaporcoat 2200 coat weight of only 5.5 g/m² was needed when a 25:75 starch:talc:Kymene 557 dispersion was added to the base sheet. The best results were obtained when Kymene 557 modified talc comprised 75% to 100% dry weight of the anionic pigment-containing mixture of the base coat formulation. A Vaporcoat 2200 coat weight of 5.3 g/m² was needed to obtain a MVTR of 50 g/m²/day when a 25:75 starch:bentonite:Kymene 557 dispersion was added to the base sheet. The Kymene 557 modified kaolin clay and laponite base coats also gave significant improvements in functional barrier top coating MVTR efficiency

TABLE 2

Evaluation of various dispersions

| Run | Size Press Base Coat | Base Coat Add'n Level (g/m²/side) | Top Coat Add'n Level (g/m²/side) | 30-Minute Cobb (g/m²) | MVTR (g/m²/day) |
|---|---|---|---|---|---|
| 1 | Blank | 0 | 0 | 82 | — |
| 2 | Blank | 0 | 4.0 | 62 | 255 |
| 3 | Blank | 0 | 7.8 | 61 | 199 |
| 4 | Blank | 0 | 9.8 | 50 | 51 |
| 5 | Blank | 0 | 10.6 | 33 | — |
| 6 | Starch | 2.8 | 0 | 120 | — |
| 7 | Starch | 2.8 | 4.2 | 80 | 220 |
| 8 | Starch | 2.8 | 6.6 | 75 | 148 |
| 9 | Starch | 2.8 | 8.1 | 59 | 79 |
| 10 | 75:25 Starch:Talc:Kymene 557 | 2.8 | 0 | 93 | — |
| 11 | 75:25 Starch:Talc:Kymene 557 | 2.8 | 3.8 | 71 | 174 |
| 12 | 75:25 Starch:Talc:Kymene 557 | 2.8 | 5.4 | 66 | 111 |
| 13 | 75:25 Starch:Talc:Kymene 557 | 2.8 | 9.1 | 49 | 57 |
| 14 | 50:50 Starch:Talc:Kymene 557 | 2.7 | 0 | 79 | — |
| 15 | 50:50 Starch:Talc:Kymene 557 | 2.7 | 3.8 | 63 | 186 |
| 16 | 50:50 Starch:Talc:Kymene 557 | 2.7 | 6.4 | 49 | 67 |
| 17 | 25:75 Starch:Talc:Kymene 557 | 2.4 | 0 | 72 | — |
| 18 | 25:75 Starch:Talc:Kymene 557 | 2.4 | 1.5 | 47 | 193 |
| 19 | 25:75 Starch:Talc:Kymene 557 | 2.4 | 4.2 | 37 | 94 |
| 20 | 25:75 Starch:Talc:Kymene 557 | 2.4 | 5.5 | 12 | 32 |
| 21 | 0:100 Starch:Talc:Kymene 557 | 2.1 | 0 | 63 | — |
| 22 | 0:100 Starch:Talc:Kymene 557 | 2.1 | 0.5 | 50 | 234 |
| 23 | 0:100 Starch:Talc:Kymene 557 | 2.1 | 2.3 | 36 | 139 |
| 24 | 0:100 Starch:Talc:Kymene 557 | 2.1 | 4.8 | 9 | 55 |
| 25 | 75:25 Starch:Laponite:Kymene 557 | 1.0 | 0 | 69 | — |
| 26 | 75:25 Starch:Laponite:Kymene 557 | 1.0 | 2.5 | 38 | 222 |
| 27 | 75:25 Starch:Laponite:Kymene 557 | 1.0 | 5.1 | 32 | 127 |
| 28 | 75:25 Starch:Laponite:Kymene 557 | 1.0 | 5.5 | 14 | 67 |
| 29 | 65:35 Starch:Laponite:Kymene 557 | 1.1 | 0 | 64 | — |
| 30 | 65:35 Starch:Laponite:Kymene 557 | 1.1 | 5.6 | 35 | 204 |
| 31 | 65:35 Starch:Laponite:Kymene 557 | 1.1 | 5.9 | 28 | 89 |
| 32 | 65:35 Starch:Laponite:Kymene 557 | 1.1 | 7.5 | 12 | 46 |

TABLE 2-continued

Evaluation of various dispersions

| Run | Size Press Base Coat | Base Coat Add'n Level (g/m²/side) | Top Coat Add'n Level (g/m²/side) | 30-Minute Cobb (g/m²) | MVTR (g/m²/day) |
|---|---|---|---|---|---|
| 33 | 75:25 Starch:Hydragloss 90:Kymene 557 | 2.9 | 0 | 85 | — |
| 34 | 75:25 Starch:Hydragloss 90:Kymene 557 | 2.9 | 7.3 | 68 | 183 |
| 35 | 75:25 Starch:Hydragloss 90:Kymene 557 | 2.9 | 8.2 | 49 | 111 |
| 36 | 50:50 Starch:Hydragloss 90:Kymene 557 | 2.7 | 0 | 83 | — |
| 37 | 50:50 Starch:Hydragloss 90:Kymene 557 | 2.7 | 6.1 | 62 | 200 |
| 38 | 50:50 Starch:Hydragloss 90:Kymene 557 | 2.7 | 7.9 | 44 | 102 |
| 39 | 25:75 Starch:Hydragloss 90:Kymene 557 | 2.5 | 0 | 84 | — |
| 40 | 25:75 Starch:Hydragloss 90:Kymene 557 | 2.5 | 4.5 | 53 | 178 |
| 41 | 25:75 Starch:Hydragloss 90:Kymene 557 | 2.5 | 6.9 | 24 | 57 |
| 42 | 0:100 Starch:Hydragloss 90:Kymene 557 | 2.1 | 0 | 85 | — |
| 43 | 0:100 Starch:Hydragloss 90:Kymene 557 | 2.1 | 2.7 | 53 | 262 |
| 44 | 0:100 Starch:Hydragloss 90:Kymene 557 | 2.1 | 6.5 | 42 | 148 |
| 45 | 0:100 Starch:Hydragloss 90:Kymene 557 | 2.1 | 8.5 | 18 | 53 |
| 46 | 50:50 Starch:Bentonite:Kymene 557 | 1.6 | 0 | 72 | — |
| 47 | 50:50 Starch:Bentonite:Kymene 557 | 1.6 | 5.8 | 47 | 229 |
| 48 | 50:50 Starch:Bentonite:Kymene 557 | 1.6 | 8.1 | 40 | 134 |
| 49 | 50:50 Starch:Bentonite:Kymene 557 | 1.6 | 8.3 | 28 | 80 |
| 50 | 25:75 Starch:Bentonite:Kymene 557 | 1.6 | 0 | 71 | — |
| 51 | 25:75 Starch:Bentonite:Kymene 557 | 1.6 | 1.4 | 45 | 222 |
| 52 | 25:75 Starch:Bentonite:Kymene 557 | 1.6 | 5.0 | 32 | 125 |
| 53 | 25:75 Starch:Bentonite:Kymene 557 | 1.6 | 5.3 | 22 | 56 |
| 54 | 0:100 Starch:Bentonite:Kymene 557 | 1.5 | 0 | 69 | — |
| 55 | 0:100 Starch:Bentonite:Kymene 557 | 1.5 | 4.2 | 46 | 251 |
| 56 | 0:100 Starch:Bentonite:Kymene 557 | 1.5 | 5.7 | 40 | 175 |
| 57 | 0:100 Starch:Bentonite:Kymene 557 | 1.5 | 7.5 | 26 | 97 |

Example 9

Evaluation of Various Pigments with and without Kymene 557 Modification

Starch:pigment base coats made with unmodified talc, bentonite, and laponite pigments were tested over a recycled liner board base sheet. Penfordgum 280 ethylated starch was used for the evaluation. The percentages of unmodified pigment used in the base coat formulations were selected based on the results described in Example 8. The results are disclosed in Table 3. 50:50 and 25:75 starch:talc:Kymene 557 dispersions were made and evaluated for companson.

The dispersions were made and applied using the methods described in Examples 5 and 6. The dispersions were applied to both sides of the linerboard. Base coat addition levels varied from 1-3 g/m² per side. A Vaporcoat 2200 functional barrier top coating was applied to the felt side of the base coat treated board using the method described in Example 7. A series of Vaporcoat 2200 coated control samples was also made by coating the untreated base sheet.

Each combination of base coat and Vaporcoat 2200 top coat was tested for 30-minute Cobb sizing (TAPPI method T-441) and moisture vapor transmission rate (TAPPI method T-448). Moisture vapor transmission rate was measured at room temperature (20-23° C.) and 85% humidity. A saturated aqueous KBr solution was used to control the relative humidity in the test chamber to 85%. Cobb sizing and MVTR test results were based on an average of three measurements.

A comparison at equal Vaporcoat 2200 top coat weights showed that adding a base coat made with unmodified talc or bentonite had little or no beneficial effect on the 30-minute Cobb or MVTR efficiency of the Vaporcoat 2200 functional barrier top coating when compared to the untreated liner board controls. The results are disclosed in Table 3. One of the unmodified laponite base coats gave small improvements in functional barrier top coating:efficiency (65:35 starch:laponite). The improvements were smaller than those obtained with base coats made using Kymene 557 modified laponite. Both base coats made with Kymene 557 modified talc gave significant increases in the 30-minute Cobb and MVTR efficiency of the Vaporcoat 2200 top coat.

TABLE 3

Evaluation of various pigments with and without Kymene 557

| Run | Size Press Base Coat | Base Coat Add'n Level (g/m²/side) | Top Coat Add'n Level (g/m²/side) | 30-Minute Cobb (g/m²) | MVTR (g/m²/day) |
|---|---|---|---|---|---|
| 1 | Blank | 0 | 0 | 240 | — |
| 2 | Blank | 0 | 3.8 | 87 | 264 |
| 3 | Blank | 0 | 4.7 | 68 | 228 |
| 4 | Blank | 0 | 6.8 | 68 | 131 |
| 5 | 50:50 Starch:Talc:Kymene 557 | 2.7 | 0 | 166 | — |
| 6 | 50:50 Starch:Talc:Kymene 557 | 2.7 | 2.6 | 72 | 196 |
| 7 | 50:50 Starch:Talc:Kymene 557 | 2.7 | 2.9 | 62 | 143 |
| 8 | 50:50 Starch:Talc:Kymene 557 | 2.7 | 4.0 | 49 | 89 |
| 9 | 25:75 Starch:Talc:Kymene 557 | 2.4 | 0 | 194 | — |
| 10 | 25:75 Starch:Talc:Kymene 557 | 2.4 | 0.5 | 57 | 227 |
| 11 | 25:75 Starch:Talc:Kymene 557 | 2.4 | 4.2 | 29 | 62 |

TABLE 3-continued

Evaluation of various pigments with and without Kymene 557

| Run | Size Press Base Coat | Base Coat Add'n Level (g/m²/side) | Top Coat Add'n Level (g/m²/side) | 30-Minute Cobb (g/m²) | MVTR (g/m²/day) |
|---|---|---|---|---|---|
| 12 | 50:50 Starch:Talc | 2.7 | 0 | 195 | — |
| 13 | 50:50 Starch:Talc | 2.7 | 4.0 | 106 | 217 |
| 14 | 50:50 Starch:Talc | 2.7 | 5.1 | 72 | 150 |
| 15 | 25:75 Starch:Talc | 2.6 | 0 | 204 | — |
| 16 | 25:75 Starch:Talc | 2.6 | 4.6 | 77 | 239 |
| 17 | 25:75 Starch:Talc | 2.6 | 5.6 | 70 | 184 |
| 18 | 25:75 Starch:Talc | 2.6 | 8.4 | 61 | 117 |
| 19 | 75:25 Starch:Laponite | 1.2 | 0 | 167 | — |
| 20 | 75:25 Starch:Laponite | 1.2 | 5.2 | 66 | 235 |
| 21 | 75:25 Starch:Laponite | 1.2 | 10.6 | 61 | 117 |
| 22 | 65:35 Starch:Laponite | 1.0 | 0 | 150 | — |
| 23 | 65:35 Starch:Laponite | 1.0 | 2.7 | 56 | 242 |
| 24 | 65:35 Starch:Laponite | 1.0 | 5.7 | 50 | 142 |
| 25 | 50:50 Starch:Bentonite | 1.6 | 0 | 217 | — |
| 26 | 50:50 Starch:Bentonite | 1.6 | 3.6 | 81 | 229 |
| 27 | 50:50 Starch:Bentonite | 1.6 | 6.1 | 72 | 163 |
| 28 | 25:75 Starch:Bentonite | 1.5 | 0 | 238 | — |
| 29 | 25:75 Starch:Bentonite | 1.5 | 4.4 | 73 | 231 |
| 30 | 25:75 Starch:Bentonite | 1.5 | 11.1 | 63 | 127 |

Example 10

Effect of Base Coat Coating Weight on Barrier Resistance

A base coat made from a dispersion of 25:75 Penfordgum 280 ethylated starch:talc:Kymene 557 was evaluated at three size press coating weights. A base coat made from a 25:75 mixture of Prequel 500 cationic starch, available from Hercules Incorporated, Wilmington, Del., and Kymene 557 modified talc was tested at two coating weights.

The dispersions were made and applied to recycled liner board using the methods described in Examples 5 and 6. The dispersion was applied to both sides of the liner board. Coating weights varied from 1.5-4.5 g/m² per side as described in Table 4. A Vaporcoat 2200 functional barrier top coating, available from Michelman Inc., was applied to both sides of the dispersion treated board. A series of Vaporcoat 2200 coated control samples was also made by coating the untreated base sheet.

Each combination of base coat and Vaporcoat 2200 top coat was tested for 30-minute Cobb sizing (TAPPI method T-441), Kit oil and grease resistance (TAPPI method T-559), and moisture vapor transmission rate (TAPPI method T-448). Moisture vapor transmission rate was measured at room temperature (20-23° C.) and 85% humidity. A saturated aqueous KBr solution was used to control the relative humidity in the test chamber to 85%. Cobb sizing, Kit oil and grease resistance, and MVTR test results were based on an average of three measurements. The results of this testing are shown in Table 4.

A Vaporcoat 2200 functional top coat weight of more than 10 g/m² was needed to obtain a 30-minute Cobb sizing value below 20 g/m² over the untreated liner board control. A Vaporcoat 2200 functional top coat weight of 7.1 g/m² was needed to obtain the same level of Cobb sizing over either of the Kymene 557 modified talc base coats. In both cases, size press base coat addition levels of 1.5-2.5 g/m² per side gave clear improvements in top coat Cobb sizing efficiency. These results show that a Kymene 557 modified talc base coat made with either ethylated or cationic starch greatly reduces the amount of expensive functional barrier top coating needed for applications that require high levels of water resistance.

Additionally, a Vaporcoat 2200 top coat weight of more than 10 g/m² was needed to obtain a MVTR of 34 g/m²/day over the untreated base sheet control. Both of the Kymene 557 modified talc base coats significantly improved the MVTR efficiency of the Vaporcoat 2200 functional top coat. In both cases, a Vaporcoat 2200 coat weight of 7-8 g/m² was needed to obtain the same level of moisture vapor resistance. Size press base coat addition levels of 1.5-2.5 g/m² per side were needed to obtain the improved MVTR efficiency.

Finally, a Vaporcoat 2200 functional top coat weight of 12.5 g/m² was needed to obtain a Kit oil and grease resistance value of 6 over the untreated liner board control. Both of the Kymene 557 modified talc base coats significantly improved the oil and grease resistance efficiency of the Vaporcoat 2200 top coat. A Vaporcoat 2200 top coat weight of 7-8/m² was needed to obtain the same level of oil and grease resistance over the Kymene 557 modified talc base coat treated board. Both base coats gave clear improvements in top coat efficiency at addition levels of 1.5-3.5 g/m² per side,

TABLE 4

Evaluation of base coats made with ethylated and cationic starch

| Run | Size Press Base Coat | Base Coat Add'n Level (g/m²/side) | Top Coat Add'n Level (g/m²/side) | 30-Minute Cobb (g/m²) | MVTR (g/m²/day) | Kit OGR |
|---|---|---|---|---|---|---|
| 1 | Blank | 0 | 5.3 | 63 | 63 | 4 |
| 2 | Blank | 0 | 10.1 | 27 | 34 | 4.5 |
| 3 | Blank | 0 | 12.5 | 8 | 22 | 6 |
| 4 | 25:75 Penford 280:Talc:Kymene 557 | 4.3 | 8.0 | 11 | 31 | 7 |

TABLE 4-continued

Evaluation of base coats made with ethylated and cationic starch

| Run | Size Press Base Coat | Base Coat Add'n Level (g/m²/side) | Top Coat Add'n Level (g/m²/side) | 30-Minute Cobb (g/m²) | MVTR (g/m²/day) | Kit OGR |
|---|---|---|---|---|---|---|
| 5 | 25:75 Penford 280:Talc:Kymene 557 | 4.3 | 9.7 | 4 | 17 | 8 |
| 6 | 25:75 Penford 280:Talc:Kymene 557 | 2.6 | 7.1 | 12 | 26 | — |
| 7 | 25:75 Penford 280:Talc:Kymene 557 | 2.6 | 9.1 | 6 | 21 | — |
| 8 | 25:75 Penford 280:Talc:Kymene 557 | 1.4 | 7.2 | 17 | 32 | — |
| 9 | 25:75 Penford 280:Talc:Kymene 557 | 1.4 | 9.3 | 6 | 22 | — |
| 10 | 25:75 Prequel 500:Talc:Kymene 557 | 3.5 | 7.2 | 13 | 25 | 6.7 |
| 11 | 25:75 Prequel 500:Talc:Kymene 557 | 3.5 | 10.8 | 4 | 19 | 7 |
| 12 | 25:75 Prequel 500:Talc:Kymene 557 | 1.5 | 7.5 | 9 | 31 | — |
| 13 | 25:75 Prequel 500:Talc:Kymene 557 | 1.5 | 10.0 | 6 | 32 | — |

Example 11

Effect of Kymene 557 Addition Level on Talc Performance

Base coats made from dispersions of 25:75 Penfordgum 280 ethylated starch:talc:Kymene 557 were evaluated at Kymene 557 ratios of Kymene 557:talc of 0:1, 0.5:1, and 0.1:1. The results of the evaluation are disclosed in Table 5. The dispersions were made using the method described in Example 5. The effect of adding Kymene 557 (no talc) to the surface of the liner board was also tested. The base coats and Kymene 557 size press treatments were applied to recycled liner board using the method described in Example 6. The base coats and Kymene 557 treatments were applied to both sides of the liner board.

A Vaporcoat 2200 functional barrier top coating, available from Michelman Inc. was applied to the felt side of the treated liner board using the method described in Example 7. A series of Vaporcoat 2200 coated control samples was also made by coating the untreated base sheet. Each combination of base coat and Vaporcoat 2200 functional top coat was tested for 30-minute Cobb sizing.

A comparison over a range of coat weights showed that adding a base coat made from a mixture of 25:75 Penford 280 ethylated starch:talc, with no Kymene 557 addition, gave at most small improvements in the Cobb sizing efficiency of the Vaporcoat 2200 top coat. The base coats made with 0.05:1 and 0.1:1 Kymene 557:talc ratios gave larger improvements in functional barrier top coating efficiency. The base coats made at 0.05:1 and 0.1:1 Kymene 557:talc ratios talc gave similar improvements in top coat efficiency.

Adding Kymene 557 directly to the surface of the liner board gave small improvements in the Cobb sizing efficiency of the Vaporcoat 2200 functional barrier top coating. Both addition levels—0.14% and 0.27%—gave similar improvements in top coat efficiency. The results are disclosed in Table 5. These results show that the combination of Kymene 557 cationic wet strength resin and anionic pigment results in much larger improvements in functional barrier top coating performance than using either Kymene 557 or an anionic pigment separately.

TABLE 5

Effect of Kymene 557 addition level

| Run | Size Press Base Coat | Base Coat Add'n Level (g/m²/side) | Top Coat Add'n Level (g/m²/side) | 30-Minute Cobb (g/m²) |
|---|---|---|---|---|
| 1 | Blank | 0 | 6.7 | 72 |
| 2 | Blank | 0 | 8.4 | 71 |
| 3 | 25:75 Penford 280:Talc:Kymene 557 (0:1)* | 4.0 | 0.5 | 94 |
| 4 | 25:75 Penford 280:Talc:Kymene 557 (0:1)* | 4.0 | 3.0 | 78 |
| 5 | 25:75 Penford 280:Talc:Kymene 557 (0:1)* | 4.0 | 4.5 | 65 |
| 6 | 25:75 Penford 280:Talc:Kymene 557 (0.05:1)* | 4.3 | 1.1 | 63 |
| 7 | 25:75 Penford 280:Talc:Kymene 557 (0.05:1)* | 4.3 | 2.1 | 55 |
| 8 | 25:75 Penford 280:Talc:Kymene 557 (0.05:1)* | 4.3 | 4.3 | 31 |
| 9 | 25:75 Penford 280:Talc:Kymene 557 (0.1:1)* | 4.0 | 3.3 | 54 |
| 10 | 25:75 Penford 280:Talc:Kymene 557 (0.1:1)* | 4.0 | 6.6 | 29 |
| 11 | Kymene 557 | 0.14% (1x) | 2.7 | 64 |
| 12 | Kymene 557 | 0.14% (1x) | 4.6 | 55 |
| 13 | Kymene 557 | 0.14% (1x) | 6.8 | 47 |
| 14 | Kymene 557 | 0.27% (2x) | 2.9 | 63 |
| 15 | Kymene 557 | 0.27% (2x) | 4.6 | 46 |

*The ratio in parentheses represents resin:anionic pigment.

Example 12

Evaluation of Kymene 450, Kymene 736, and Kymene 2064 Modified Talc Base Coats

Base coats made from dispersions of 25:75 Penfordgum 280 ethylated starch:talc:cationic wet strength resin were evaluated where the cationic wet strength resins were Kymene 450, Kymene 736, and Kymene 2064, all available from Hercules Incorporated, Wilmington, Del. The cationic wet strength resin was added at a resin:talc weight ratio of 0.05:1 for each dispersion. The dispersions were made using the method disclosed in Example 5.

Each base coat was evaluated for its effect on the performance of a Vaporcoat 2200 functional barrier top coating. Each base coat was applied to both sides of a sheet of recycled liner board using the method described in Example 6 and a Vaporcoat 2200 functional barrier top coating was applied to the felt side of the treated liner board using the method described in Example 7. A series of liner board samples coated with only the Vaporcoat 2200 functional barrier top coating was used as controls. Each combination of the base coat and Vaporcoat 2200 functional barrier top coating was tested for 30-minute Cobb sizing. The results are disclosed in Table 6.

A comparison over a range of coat weights showed that all three wet strength resin modified talcs improved the Cobb sizing efficiency of the Vaporcoat 2200 functional barrier top coating (versus top coat addition to the untreated base sheet control).

TABLE 6

Performance of various wet strength resin modified talcs

| Run | Size Press Base Coat | Base Coat Add'n Level (g/m²/side) | Top Coat Add'n Level (g/m²/side) | 30-Minute Cobb (g/m²) |
|---|---|---|---|---|
| 1 | Blank | 0 | 2.3 | 86 |
| 2 | Blank | 0 | 3.5 | 76 |
| 3 | Blank | 0 | 4.4 | 68 |
| 4 | Blank | 0 | 5.0 | 66 |
| 5 | 25:75 Penford 280:Talc:Kymene 450 (0.05:1)* | 4.0 | 2.9 | 64 |
| 6 | 25:75 Penford 280:Talc:Kymene 450 (0.05:1)* | 4.0 | 3.3 | 54 |
| 7 | 25:75 Penford 280:Talc:Kymene 450 (0.05:1)* | 4.0 | 3.8 | 39 |
| 8 | 25:75 Penford 280:Talc:Kymene 736 (0.05:1)* | 4.1 | 0.7 | 77 |
| 9 | 25:75 Penford 280:Talc:Kymene 736 (0.05:1)* | 4.1 | 2.2 | 48 |
| 10 | 25:75 Penford 280:Talc:Kymene 736 (0.05:1)* | 4.1 | 4.2 | 33 |
| 11 | 25:75 Penford 280:Talc:Kymene 2064 (0.05:1)* | 4.2 | 0.5 | 65 |
| 12 | 25:75 Penford 280:Talc:Kymene 2064 (0.05:1)* | 4.2 | 2.3 | 61 |
| 13 | 25:75 Penford 280:Talc:Kymene 2064 (0.05:1)* | 4.2 | 3.5 | 44 |
| 14 | 25:75 Penford 280:Talc:Kymene 2064 (0.05:1)* | 4.2 | 4.4 | 44 |

*The ratio in parentheses represents resin:anionic pigment.

Example 13

Evaluation of Kymene 557 Modified Talc Using Polyvinylalcohol as the Binder

A base coat was made using a dispersion of 25:75 binder:talc:Kymene 557. The water soluble binder was a 50:50 mixture of Penford 280 ethylated starch:Elvanol 90-50 polyvinylalcohol. The Elvanol 90-50 polyvinylalcohol is available from DuPont, Wilmington, Del. The base coat was made using the method disclosed in Example 5.

Each base coat was evaluated for its effect on the performance of a Vaporcoat 2200 functional barrier top coating. Each base coat was applied to both sides of a sheet of recycled liner board using the method described in Example 6 and a Vaporcoat 2200 functional barrier top coating was applied to the felt side of the treated liner board using the method described in Example 7. A series of liner board samples coated with only the Vaporcoat 2200 function barrier top coating was use as a control. Each combination of the base coat and Vaporcoat 2200 functional barrier top coating was tested for 30-minute Cobb sizing. The results are disclosed in Table 7.

A comparison over a range of coat weights showed that adding the Kymene 557 modified talc base coat improved the Cobb sizing efficiency of the Vaporcoat 2200 functional barrier top coating when a starch:polyvinylalcohol blend was used as the water soluble binder for the base coat.

TABLE 7

Evaluation of Kymene 557 modified talc with 50:50 ethylated starch:polyvinylalcohol water soluble binder

| Run | Size Press Base Coat | Base Coat Add'n Level (g/m²/side) | Top Coat Add'n Level (g/m²/side) | 30-Minute Cobb (g/m²) |
|---|---|---|---|---|
| 1 | 12.5:12.5:75 Penford 280:Talc:Kymene 557 (0.05:1)* | 4.5 | 4.6 | 52 |
| 2 | 12.5:12.5:75 Penford 280:Talc:Kymene 557 (0.05:1)* | 4.5 | 5.3 | 49 |
| 3 | 12.5:12.5:75 Penford 280:Talc:Kymene 557 (0.05:1)* | 4.5 | 6.4 | 45 |
| 4 | 50:50 Polyvinylalcohol:Penford 280 | 5.5 | 4.1 | 105 |
| 5 | 50:50 Polyvinylalcohol:Penford 280 | 5.5 | 5.0 | 109 |

*The ratio in parentheses represents resin:anionic pigment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A dispersion having a cationic zeta potential for use as a base coating on a sheet of paper or paperboard as a primer for a functional barrier top coating, comprising: (a) an anionic kaolin clay and/or an anionic talc in an amount of at least about 20% dry weight of the dispersion, and (b) one or more polyamine-epihalohydrin cationic wet strength resins selected from polyaminopolyamide-epihalohydrin resins, and wherein the weight ratio of cationic wet strength resin to anionic pigment is from about 0.03:1 to about 0.2:1.

2. The dispersion of claim 1 wherein the weight ratio of cationic wet strength resin:anionic pigment is from about 0.6:1 to about 0.8:1.

3. The dispersion of claim 1 wherein the polyaminopolyamide-epihalohydrin resins are selected from group consisting of polyaminoamide-epihalohydrin resins, polyamide-polyamine-epihalohydrin resins, polyaminepolyamide-epihalohydrin resins, aminopolyamide-epihalohydrin resins, and polyamide-epihalohydrin resins; polyalkylene polyamine-epihalohydrin resins; polyaminourylene-epihalohydrin resins; copolyamide-polyurylene-epichlorohydrin resins; and polyimide-polyarylene-epichlorohydrin resins.

* * * * *